July 31, 1945.    E. F. MILLER    2,380,776
GEAR CONSTRUCTION
Filed March 27, 1943

WITNESSES:

INVENTOR
ERNEST F. MILLER
BY
ATTORNEY

Patented July 31, 1945

2,380,776

UNITED STATES PATENT OFFICE 2,380,776

GEAR CONSTRUCTION

Ernest F. Miller, Lansdowne, Pa., assignor to Westinghouse Electric Corporation, East Pittsburgh, Pa., a corporation of Pennsylvania Application March 27, 1943, Serial No. 480,724

2 Claims. (Cl. 74—443)

This invention relates to gears, more particularly to gears of the larger sizes where reduction in weight is desirable and it has for an object the provision of improved gears of this character.

Another object of the invention is to provide gears which are relatively quiet in operation.

A further object of the invention is to provide a gear construction involving a resilient supporting structure between the hub and rim.

Yet another object of the invention is to provide, in a fabricated gear whose rim is welded to the web structure, means reducing or eliminating the tendency to cracking of the welded connection.

A further object of the invention is to provide a gear construction which is resilient in a radial direction from the hub to the rim.

These and other objects are effected by the invention as will be apparent from the following description and claims taken in accordance with the accompanying drawing, forming a part of this application, in which:

Figure 2:
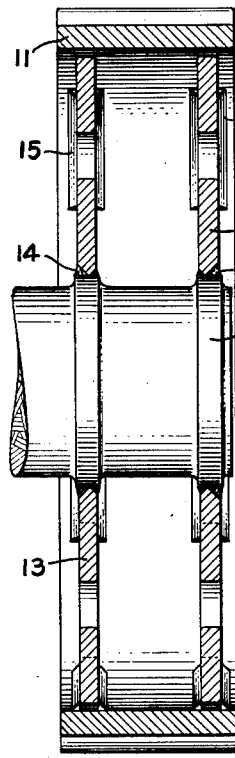
Fig. 2 is a sectional view taken along the line II—II of Fig. 1, looking in the direction indicated by the arrows; and, Fig. 3 is a side elevational view of a modified construction.

Referring now to the drawing more in detail, there is shown, at 10, a fabricated gear comprising a toothed rim 11 secured to a hub 12 by a web structure 13. The web may be in the form of a pair of axially-spaced plane or conical discs, or of a single disc, welded to the hub 12, at 14, and to the rim 11, at 15.

Figure 1:
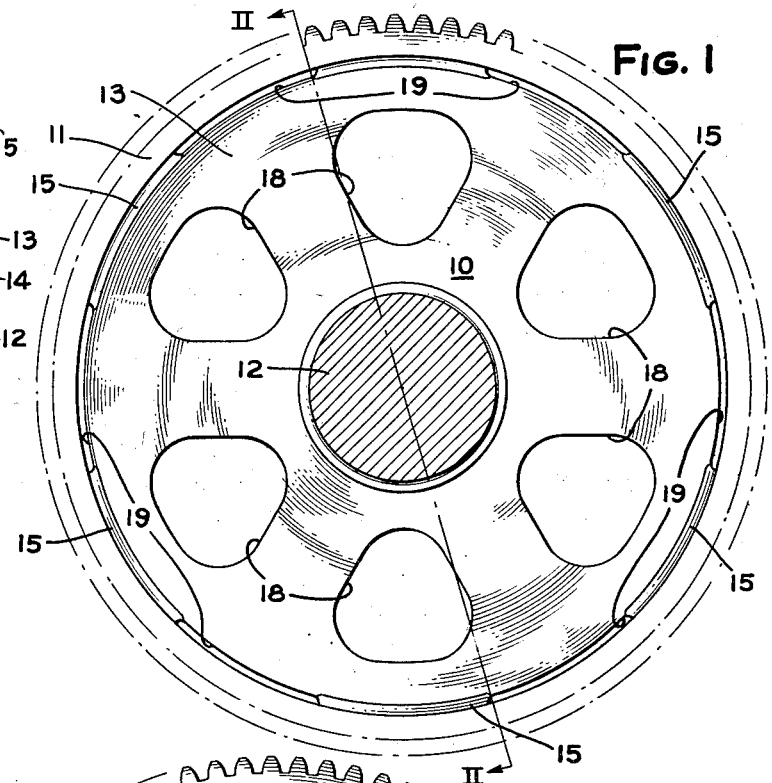
Fig. 1 is a side elevational view of a fabricated gear involving the features of the present invention.

In order to prevent cracking of the welds 15 and to render the entire structure lighter in weight and quieter in operation by increasing the axial resiliency of the web structure, the latter is provided with a first inner annular series of openings 18 spaced uniformly. A second outer annular series of openings 19 is provided at a greater distance from the axis of the gear than the series of openings 18. Preferably, these openings 19 are positioned with their radial centers lying midway of adjacent pairs of openings 18, the openings 18 and 19 being of such circumferential extent that they overlap when considered with regard to radii of the gear. This arrangement is illustrated in Fig. 1 where the sectional line II—II intersects both the inner openings 18 and the outer openings 19. It will be apparent that this arrangement provides a construction wherein there exists no continuous radial line of metal from the hub to the rim, with the result that there can be no direct pull on the welds 15 due to shrinkage.

It will also be apparent that this web arrangement produces a resilient construction, resulting in quieter operation and longer life, and hence, is highly desirable even in cast gears where no weld cracking problems are present.

Figure 3:
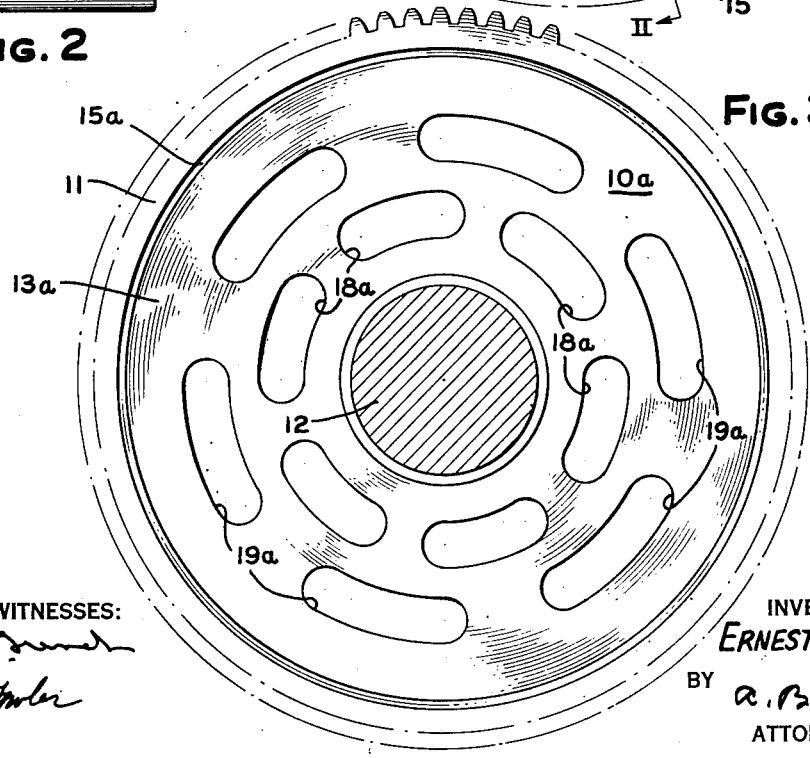

In Fig. 3 there is shown a modified arrangement of inner openings 18a and outer openings 19a, provided in the web 13a connecting the rim 15a with the hub 12.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. A fabricated metallic structure comprising a hub; an annular rim concentric with and spaced radially from the hub; a web structure for supporting the rim from the hub; welds uniting the web structure to the hub and the rim; and means for preventing cracking of the welds due to weld shrinkage strains, said means comprising the formation of the web structure with a plurality of openings therethrough so disposed that no continuous radial line of metal exists between the welding at the hub and the welding at the rim.

2. A fabricated gear comprising a hub; a toothed rim; a web structure welded to the hub and to the rim for supporting the latter from the former; and means for preventing cracking of the welded connections between the web structure and the rim and hub due to weld shrinkage strains, said means comprising the web structure provided with a first annular series of spaced openings therethrough and a second annular series of spaced openings therethrough with the latter openings spaced farther from the hub than the former and being in staggered relation thereto whereby there is provided a radially resilient web construction.

ERNEST F. MILLER.